United States Patent

Gramss

Patent Number: 5,673,958
Date of Patent: Oct. 7, 1997

[54] TANK CAP

[75] Inventor: Rainer Gramss, Würzburg, Germany

[73] Assignee: ITW-ATECO GmbH, Norderstedt, Germany

[21] Appl. No.: 628,468

[22] Filed: Apr. 5, 1996

[30] Foreign Application Priority Data

May 13, 1995 [DE] Germany .................. 195 17 706.1

[51] Int. Cl.$^6$ .................................................. B62D 25/00
[52] U.S. Cl. ............................. 296/97.22; 220/86.2
[58] Field of Search .................... 296/99.22, 901, 296/146.5; 280/853; 16/227; 220/86.1, 86.2

[56] References Cited

U.S. PATENT DOCUMENTS

| | | | |
|---|---|---|---|
| 4,142,756 | 3/1979 | Henning et al. | 296/1 C |
| 4,527,825 | 7/1985 | Clouse | 296/1 C |
| 5,044,678 | 9/1991 | Detweiler | 292/144 |
| 5,118,155 | 6/1992 | Koop | 296/1.1 |
| 5,165,749 | 11/1992 | Sheppard | 296/97.22 |
| 5,231,948 | 8/1993 | Malmanger et al. | 114/201 R |
| 5,462,190 | 10/1995 | Lienhart et al. | 220/375 |
| 5,533,766 | 7/1996 | Farber | 292/144 |

FOREIGN PATENT DOCUMENTS 928795  6/1963  United Kingdom .

Primary Examiner—David M. Mitchell
Assistant Examiner—Jonathan J. Yun
Attorney, Agent, or Firm—Schwartz & Weinrieb

[57] ABSTRACT

A tank cap which is pivotally supported, preferably about an approximately vertical axis, at an end portion of a tank inlet tray of an automotive vehicle, a carrier element of plastic material being provided having an outer circumference approximately corresponding to that of the tank cap and being pivotally supported by the inlet tray, and a cover element of sheet metal being attached to the outer surface of the carrier element.

23 Claims, 2 Drawing Sheets

5,673,958

TANK CAP

FIELD OF THE INVENTION

The present invention relates generally to tank caps, and more particularly to a tank cap for use upon automotive vehicles.

BACKGROUND OF THE INVENTION

Inlet trays of a car tank and tank caps for automotive vehicles have been manufactured as vendor parts for some time. A tray body of synthetic material is inserted into a sheet metal hole of the car body and, preferably, is secured by means of a snapping connection. In the bottom area the tray body includes a hole for the passage of the pipe socket of the car tank. The tank cap is composed of synthetic material as well and is connected to the tray body by means of a suitable hinge joint.

The outer surface of the tank cap naturally needs to be of the same color as the automotive vehicle. Since, however, the undersurface or substrate is different, that is sheet metal for the car body and synthetic material for the tank cap, and painting is performed by different manufacturing companies at different places, the same shade of color is not always guaranteed.

Considering the fact that the tank cap of synthetic material is subjected to such known painting procedures, especially the relatively high temperatures in an enamelling stove, it needs to be made of relatively high-quality synthetic material which results in increased material requirements.

OBJECT OF THE INVENTION

It, therefore, is the object of the invention to provide a tank cap for automotive vehicles which, in spite of the low manufacturing expense, guarantees the same shade of color of the coating as the car body of the automotive vehicle.

SUMMARY OF THE INVENTION

According to the inventive tank cap, two separate structural elements are provided, that is one carrier element of plastic material which is pivotally supported by the inlet tray in a conventional way. And a cover element of sheet metal is provided which is attached to the outer surface of the carrier element. Securing may be made by bonding or welding, for instance but, according to an embodiment of the invention, a snapping connection is preferred. A structure of that kind has significant advantages.

Considering the fact that the carrier element will not be painted any more it may be made of a less expensive plastic material. It, therefore, needs to be designed for its mechanical properties only. The separation of the cover element from the carrier element has the advantage that the cover element may be painted together with the car body. In this way, a color identity between both these elements is provided. Only upon termination of the painting procedure is the cover element connected to the carrier element by means of a snapping connection, for instance. The cover element may be made of any discharge sheet obtained during the production of automotive vehicles so that the cost of production of the cover element is low as well.

According to a particular embodiment of the invention, the cover element comprises a circumferential flange bent rearwardly and embracing the carrier element which may be provided with a corresponding flange as well. Preferably, holes are formed in the flange which accommodate projections at the circumference of the carrier element so as to realize a snapping connection. It goes without saying that cams may also be formed in the flange and the holes in the carrier element.

According to another embodiment of the invention, a space is provided between the cover element and the carrier element, as well as at least one drainage opening in the lower area. Between the carrier element and the cover element condensate may be formed. It, therefore, will be necessary to remove the humidity. This is realized by a corresponding space between these elements. Such a space is of particular necessity if, according to an embodiment of the invention, the carrier element is plate-shaped. Any ribs or other projections within the surface of the carrier element may serve as spacers.

According to a further embodiment of the invention, the tank cap is attached to the inlet tray by means of a snapping connection. The tank cap, thus, may be mounted at any time whatever and considerably later, if desired. Upon termination of the manufacturing process the automotive vehicle is automatically filled up with gasoline so as to allow it to be driven to any place desired. During this automatic filling up process the opened tank caps are often inconvenient. Damage may also be caused as well. According to the inventive solution, the tank cap may be attached only after the automatic filling up process by simply snapping the tank cap onto the inlet tray.

According to a particular embodiment of the snapping connection, the carrier element on its rear side comprises three bearing extensions having bearing holes or bearing pins which cooperate with bearing pins or bearing holes of a bearing portion of the inlet tray, with the central bearing extension engaging a fork-shaped portion of the bearing portion. Such a structure centers the tank cap automatically, irrespective of any possible tolerances, so that the tank cap is spaced from the wall of the opening of the car body by the same spacing all around.

BRIEF DESCRIPTION OF THE DRAWINGS

Various other objects, feature an attendant advantages of the present invention will be explained in more detail hereinafter with the aid of the accompanying drawings in which like reference characters designate like or corresponding parts throughout the several views, and wherein.

DETAILED DESCRIPTION OF THE PREFERRED EMBODIMENT

Figure 1:
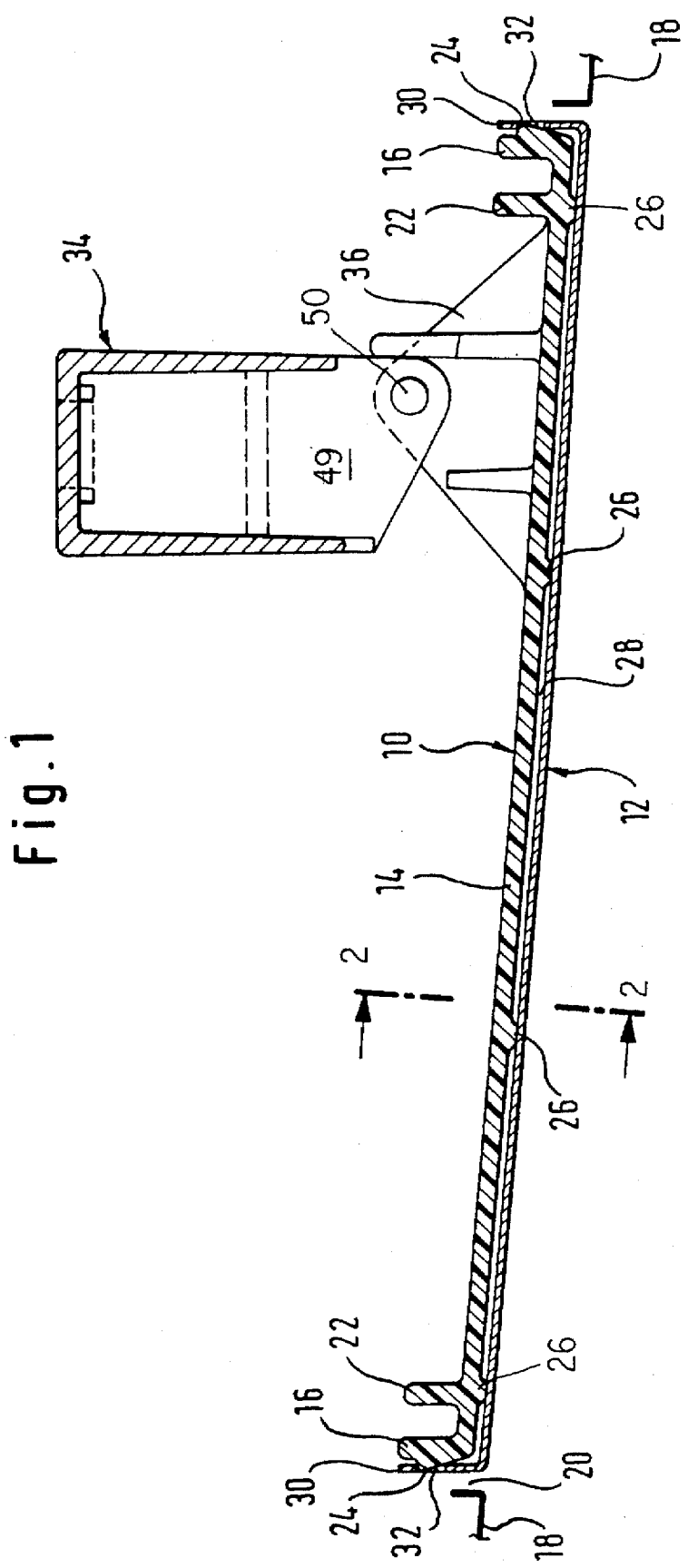
FIG. 1 is a section through an edge of the tank cap according to the invention.
Figure 2:
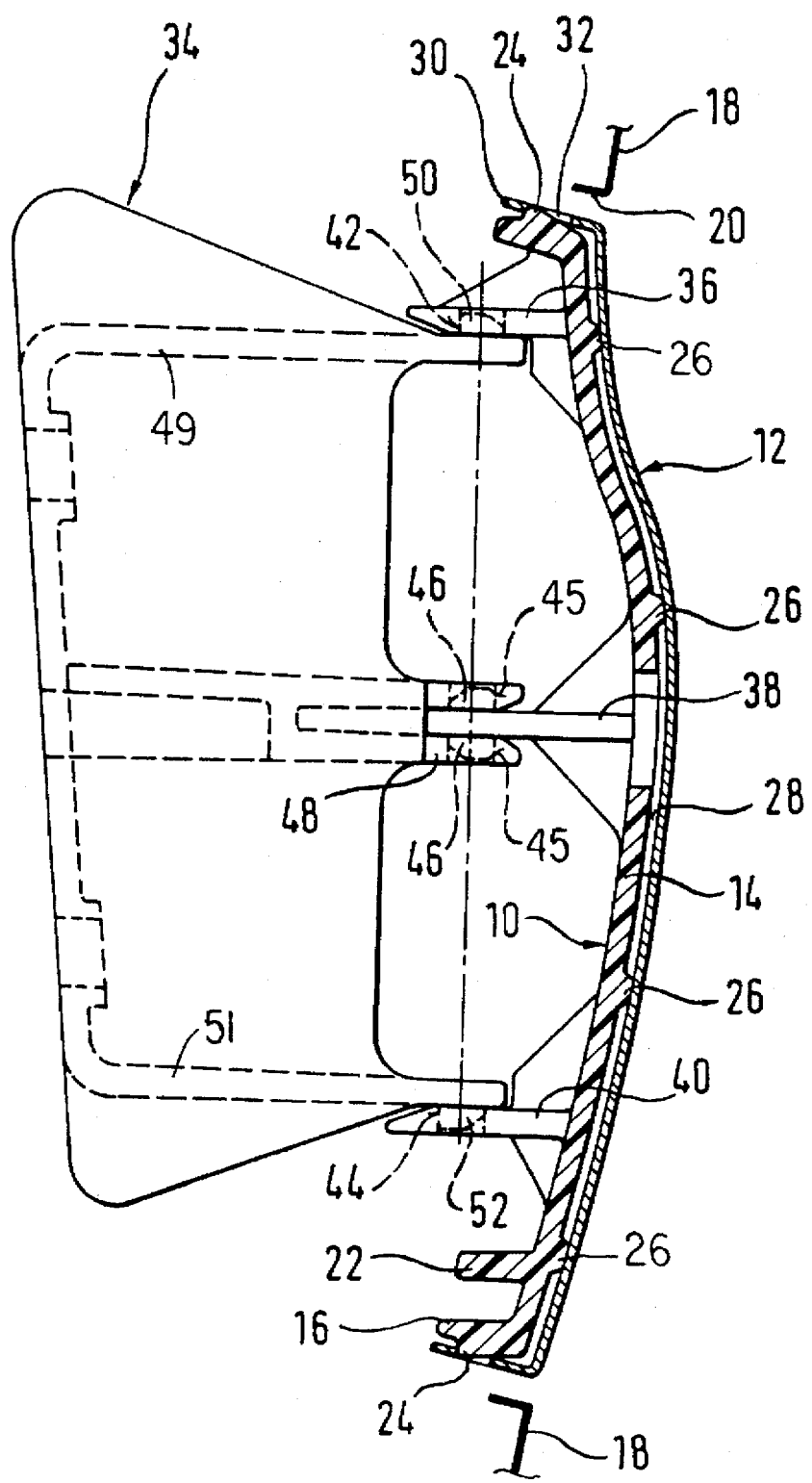
FIG. 2 is a section through the tank cap according to FIG. 1, taken along line 2—2.

The tank cap shown in FIGS. 1 and 2 comprises a plate-shaped carrier element 10 and a plate-shaped cover element 12. The carrier element 10 includes a central plate-shaped portion 14 of substantially uniform thickness, on the outer surfaces of which a circumferential flange 16 is formed which points rearwardly. In FIGS. 1 and 2 the car body is shown at 18. Therein an opening 20 for the accommodation of an inlet tray (not shown) as well as an associated tank cap according to FIGS. 1 and 2 is provided.

A further circumferential flange 22 spaced from flange 16 by a radial spacing and radially inwardly serves stiffening purposes. As shown at 24, on the outer surface of flange 16 a plurality of projections are formed which are pointing outwardly. The front surface of central portion 14 pointing to the cover element 12 comprises a plurality of ribs 26 serving as spacers so as to provide a space 28 between cover element 12 and carrier element 10.

The cover element 12 is formed of sheet metal and comprises a circumferential flange 30 on its edge, which flange engages flange 16 of the carrier element 10, the flange 30 including holes, as shown at 32, which accommodate projections 24 so as to snap in as soon as the cover element 12 is attached to the carrier element 10. In this way, a snapping connection between the carrier element 10 and the cover element 12 is provided. Preferably, the inclination of flange 30 is selected so as to engage flange 16 under tension.

As appears from FIGS. 1 and 2, the complete cap is mounted pivotally on a bearing or bracket portion 34 which is arranged within the inlet tray not shown. It may be pivotally supported so as to allow a movement of the cap in the same plane, or may be fixedly located. Alternatively, the bearing or bracket portion 34 may be formed together with the tank inlet tray so as to be one piece. On the rear side the carrier element 10 comprises three parallel bearing extensions or bracket members 36, 38, 40 spaced from each other, the outer bearing extensions or bracket members 36, 40 including transversely extending bearing holes 42 or 44. The central bearing extension or bracket member 38 is provided with transversely extending bearing or trunnion pins 45 on both sides which engage holes 46 of a fork-shaped bearing portion or bracket member 48. The bearing extension or bracket member 38 is inserted into the recess of the fork-shaped bearing portion or bracket member 48, with its pins 45 snapping into holes 46. The outer bearing extensions or bracket members 36 and 40 cooperate with bearing or trunnion pins 50, 52 of bearing or bracket extensions 49, 51 of the bearing portion or bracket member 34 which snap into holes 42 or 44. Bearing or trunnion pins 50, 52 or 45 on the opposite sides or ends of the carrier element 10 are provided with an inclination to facilitate snapping into the bearing holes.

The shown bearing allows the tank cap to be centered and, above all, to be mounted at any later date whatever. Besides, a solid connection is provided which also withstands any impacts and strokes against the opened cap.

Obviously, many modifications and variations of the present invention are possible in light of the above teachings. It is therefore to be understood that within the scope of the appended claims, the present invention may be practiced otherwise than as specifically described herein.

I claim:

1. A composite cover for covering a recess, defined within an automobile vehicle body, wherein the automobile vehicle body is fabricated from a predetermined material, and operatively associated with a fuel tank pipe and cap, comprising:

a carrier member comprising a first substantially plate-type member, first flange means defined upon edge portions of said first substantially plate-type member of said carrier member, and a plurality of projections disposed upon said first flange means of said carrier member;

means connected to said carrier member for pivotally mounting said carrier member upon an automotive vehicle; and a cover member, fabricated from a material which is substantially the same as said predetermined material comprising said vehicle body, comprising a second substantially plate-type member, second flange means, defined upon edge portions of said second substantially plate-type member of said cover member for covering said first flange means of said carrier member, and a plurality of apertures defined within said second flange means of said cover member for accommodating said plurality of projections disposed upon said first flange means of said carrier member when said second flange means of said cover member overlies said first flange means of said carrier member so as to enable said cover member to be separably mountable upon said carrier member.

2. A composite cover as set forth in claim 1, wherein:
said carrier member comprises a plastic material; and
said cover member comprises a metal material.

3. A composite cover as set forth in claim 1, wherein:
said plurality of projections disposed upon said carrier member and said plurality of apertures defined within said cover member comprise means for snap-fitting said cover member in a separable manner upon said carrier member.

4. A composite cover as set forth in claim 3, wherein:
said second flange means of said cover member are inclined toward said first flange means of said carrier member such that said snap-fitting engagement of said cover member upon said carrier member is achieved under tension.

5. A composite cover as set forth in claim 1, further comprising:
spacing means defined upon said plate-type carrier member for engaging said plate-type cover member when said plate-type cover member is separably mounted upon said carrier member such that said plate-type cover member is spaced a predetermined distance from said plate-type carrier member.

6. A composite cover as set forth in claim 5, wherein:
said spacing means of said carrier member comprises a plurality of ribs projecting outwardly from one surface of said carrier member and engaging a surface of said cover member.

7. A composite cover as set forth in claim 1, further comprising:
a plurality of bracket means integral with said carrier member for pivotably mounting said carrier member upon an automotive vehicle.

8. A composite cover as set forth in claim 7, further comprising:
a plurality of bracket means for integral connection to an automotive vehicle; and
trunnion pin and aperture means formed upon said plurality of bracket means of said carrier member for snap-fittingly engaging corresponding aperture and trunnion pin means formed upon said plurality of bracket means for integral connection to an automotive vehicle.

9. A composite cover as set forth in claim 8, wherein:
said bracket means for integral connection to an automotive vehicle and said bracket means of said carrier member each comprise three bracket members laterally spaced with respect to each other with a central one of said bracket members for integral connection to an automotive vehicle comprising a forked-type bracket member, while a central one of said bracket members of said carrier member is disposed within a recess defined within said forked-type bracket member.

10. A composite cover for covering a recess, defined within an automotive vehicle body, wherein the automotive vehicle body is fabricated from a predetermined material, and operatively associated with a fuel tank pipe and cap, comprising:

a carrier member comprising a first substantially plate-type member and first flange means defined upon edge portions of said first substantially plate-type member of said carrier member;

means connected to said carrier member for pivotably mounting said carrier member upon an automotive vehicle a cover member fabricated from a material which is substantially the same as said predetermined material comprising said automotive vehicle body and comprising a second substantially plate-type member having second flange means defined upon edge portions of said second substantially plate-type member of said cover member for covering said first flange means of said carrier member; and means defined upon said first flange means of said carrier member and said second flange means of said cover member for cooperating together when said second flange means of said cover member overlies said first flange means of said carrier member so as to enable said cover member to be separably mountable upon said carrier member.

11. A composite cover as set forth in claim 10, wherein:

said carrier member comprises a plastic material; and said cover member comprises a metal material.

12. A composite cover as set forth in claim 10, wherein:

said means for separably mounting said cover member upon said carrier member comprises snap-fitting means.

13. A composite cover as set forth in claim 12, wherein said snap-fitting means comprises:

a plurality of projections disposed upon one of said first and second flange means of said carrier member and said cover member, and a plurality of apertures defined within the other one of said first and second flange means of said carrier member and said cover member for receiving respectively said plurality of said projections of said one of said first and second flange means of said carrier member and said cover member such that said cover member is able to be snap-fittingly mounted upon said carrier member.

14. A composite cover as set forth in claim 10, further comprising:

spacer means defined upon one of said plate-type carrier and cover members for maintaining said plate-type carrier and cover members in a spaced relationship with respect to each other when said cover member is separably mounted upon said carrier member.

15. A composite cover as set forth in claim 14, wherein:

said spacer means comprises a plurality of ribs defined upon a surface of said one of said plate-type carrier and cover members and engaging a surface of the other one of said plate-type carrier and cover members.

16. A composite cover as set forth in claim 10, wherein:

said means connected to said carrier member for pivotably mounting said carrier member upon an automotive vehicle comprises first bracket means;

second bracket means are provided for integral connection to an automotive vehicle; and trunnion pin and aperture means are provided upon said first and second bracket means for pivotably mounting said composite cover, comprising said carrier member and said cover member, upon an automotive vehicle as a result of trunnion pin and aperture means of said first bracket means engaging corresponding aperture and trunnion pin means of said second bracket means.

17. In combination, a composite cover for covering a recess defined within an automotive vehicle body and operatively associated with a fuel tank pipe and cap of said automotive vehicle body, comprising:

an automotive vehicle body portion fabricated from a predetermined material;

a carrier member comprising a first substantially plate-type member and first flange means defined upon edge portions of said first substantially plate-type member of said carrier member;

means defined between said carrier member and said automotive vehicle body portion for pivotably mounting said carrier member upon said automotive vehicle body portion;

a cover member fabricated from a material which is substantially the same as said predetermined material comprising said automotive plate-type member having second flange means define upon edge portions of said second substantially plate-type member of said cover member for covering said first flange means of said carrier member and means defined upon said first flange means of said carrier member and said second flange means of said cover member for cooperating together when said second flange means of said cover member overlies said first flange means of said carrier member so as to separably mount said cover member upon said carrier member.

18. The combination as set forth in claim 17, wherein:

said carrier member comprises a plastic material; and said cover member and said automotive vehicle body comprise metal materials.

19. The combination as set forth in claim 17, wherein:

said means for separably mounting said cover member upon said carrier member comprises snap-fitting means.

20. The combination as set forth in claim 19, wherein said snap-fitting means comprises:

a plurality of projections disposed upon one of said first and second flange means of said carrier member and said cover member, and a plurality of apertures defined within the other one of said first and second flange means of said carrier member and said cover member for respectively receiving said plurality of projections of said one of said first and second flange means of said carrier member and said cover member such that said cover member is able to be snap-fittingly mounted upon said carrier member.

21. The combination as set forth in claims 17, further comprising:

spacer means defined upon one of said plate-type carrier and cover members for maintaining said plate-type carrier and cover members in a spaced relationship with respect to each other when said cover member is separably mounted upon said carrier member.

22. The combination as set forth in claim 21, wherein said spacer means comprises:

a plurality of ribs disposed upon one surface of said one of said plate-type carrier and cover members and engaging one surface of the other one of said plate-type carrier and cover members.

23. The combination as set forth in claim 17, wherein said means for pivotably mounting said carrier member upon said automotive vehicle body portion comprises:

first bracket means integral with said automotive vehicle second bracket means integral with said carrier member; and pin and aperture means defined within said first and second bracket means for pivotably connecting said carrier member to said automotive vehicle portion.

* * * * *